(12) United States Patent
Miyake et al.

(10) Patent No.: US 7,259,472 B2
(45) Date of Patent: Aug. 21, 2007

(54) WIND TURBINE GENERATOR

(75) Inventors: Hisao Miyake, Nagasaki-ken (JP); Masaaki Shibata, Nagasaki-ken (JP); Yasuyoshi Tozaki, Nagasaki-ken (JP); Katsuhiko Shoda, Nagasaki-ken (JP)

(73) Assignee: Mitsubishi Heavy Industries, Ltd, Tokyo (JP)

( * ) Notice: Subject to any disclaimer, the term of this patent is extended or adjusted under 35 U.S.C. 154(b) by 15 days.

(21) Appl. No.: 11/312,575

(22) Filed: Dec. 21, 2005

(65) Prior Publication Data
US 2006/0138781 A1 Jun. 29, 2006

(30) Foreign Application Priority Data
Dec. 28, 2004 (JP) .............................. 2004-381564

(51) Int. Cl.
*F03D 9/00* (2006.01)
(52) U.S. Cl. .......................................... 290/55; 290/44
(58) Field of Classification Search .................. 290/43, 290/44, 54, 55; 416/44, 47
See application file for complete search history.

(56) References Cited

U.S. PATENT DOCUMENTS

| | | | | |
|---|---|---|---|---|
| 2,153,523 A | * | 4/1939 | Edmonds et al. ............. | 290/55 |
| 4,585,950 A | * | 4/1986 | Lund ............................ | 290/44 |
| 4,613,760 A | * | 9/1986 | Law ............................. | 290/1 C |
| 5,281,094 A | * | 1/1994 | McCarty et al. ............ | 416/147 |
| 6,285,090 B1 | * | 9/2001 | Brutsaert et al. ............ | 290/55 |
| 6,304,002 B1 | * | 10/2001 | Dehlsen et al. ............ | 290/1 C |
| 6,452,287 B1 | * | 9/2002 | Looker ........................ | 290/55 |
| 7,075,192 B2 | * | 7/2006 | Bywaters et al. ............ | 290/55 |
| 7,154,193 B2 | * | 12/2006 | Jansen et al. ................ | 290/55 |
| 7,160,083 B2 | * | 1/2007 | Pierce et al. ................. | 416/61 |
| 7,175,389 B2 | * | 2/2007 | Moroz ......................... | 416/1 |

FOREIGN PATENT DOCUMENTS

| | | |
|---|---|---|
| JP | 05-079450 | 3/1993 |
| JP | 2001-304094 A | 10/2001 |
| JP | 2002-303253 | 10/2002 |
| JP | 2004-108164 A | 4/2004 |

* cited by examiner

*Primary Examiner*—Nicholas Ponomarenko
(74) *Attorney, Agent, or Firm*—Lowe Hauptman & Berner, LLP

(57) ABSTRACT

A wind turbine generator including a nacelle having reduced size and weight is provided. The wind turbine generator includes a nacelle disposed on a tower. The nacelle includes a main shaft that is connected to a rotor head equipped with blades and that integrally rotates with the rotor head, a gearbox that increases the rotational speed of the main shaft and that outputs the resulting rotational speed, and a generator driven by the output from the gearbox. In the wind turbine generator, a drivetrain extending from the main shaft to the generator via the gearbox is disposed in the rotor head.

3 Claims, 2 Drawing Sheets

WIND TURBINE GENERATOR

BACKGROUND OF THE INVENTION

1. Field of the Invention

The present invention relates to a wind turbine generator for generating electric power with a windmill which converts wind, which is a natural form of energy, into a rotational force.

This application is based on Japanese Patent Application No. 2004-381564, the content of which is incorporated herein by reference.

2. Description of Related Art

Wind turbine generators for generating electric power using wind power, which is a natural form of energy, are known. Such a wind turbine generator includes a nacelle disposed on a tower. The nacelle includes a rotor head equipped with blades, a main shaft connected to the rotor head so as to integrally rotate with the rotor head, a gearbox connected to the main shaft that rotates upon receiving the wind power supplied to the blades, and a generator driven by a shaft output from the gearbox. According to the wind turbine generator having this structure, the rotor head equipped with the blades, which convert wind power into a rotational force, and the main shaft rotate to generate a shaft output. The rotational speed is increased via the gearbox connected to the main shaft and the resulting shaft output is transmitted to the generator. Consequently, the shaft output obtained by converting the wind power into the rotational force is used as a driving source of the generator, and thus power generation can be performed using the wind power as motive power for the generator.

In the above-described known wind turbine generator, the rotor head is disposed at the front end of the nacelle, and the gearbox and the generator are placed on a nacelle bed provided behind the rotor head of the nacelle and in a casing forming the upper space of the nacelle bed (for example, refer to Japanese Unexamined Patent Application Publication No. 2001-304094).

As described above, according to the structure of the known wind turbine generator, a rotational torque is transmitted from the rotor head provided at the front end of the nacelle to the main shaft, the rotational speed is increased with the gearbox, and the motive power is then transmitted to the generator for use. As a result, the drivetrain inevitably becomes long in the shaft direction. However, in the known structure, the gearbox and the generator, which are connected at the rear end of the main shaft, are placed in the casing provided behind the rotor head, and the inside of the rotor head is not used as a space for the drivetrain. Therefore, in order to obtain a space for placing the gearbox and the generator, the dimensions of the nacelle bed and the casing part of the nacelle must be increased particularly in the shaft direction, thereby increasing the size of the whole nacelle. Such an increase in the size of the nacelle increases the weight of the nacelle bed and the casing, resulting in an increase in weight of the nacelle itself.

Furthermore, since recent wind turbine generators tend to increase their output by increasing the size thereof, the sizes of components such as the rotor head, the main shaft, the gearbox, and the generator also increase, resulting in an increase in weight. In the same structure as that of the known wind turbine generator, in particular, since the overall structure of the nacelle, including the nacelle bed and the casing, further increases, it is inevitable that the weight of the whole nacelle drastically increases. The increase in weight of the nacelle has a significant undesirable effect on, for example, the design strength of the tower and production costs because the nacelle is a structure provided on the upper part of the tower. From this standpoint, it is desirable that the dimension of nacelle in the shaft direction be as small as possible so as to reduce the size and the weight of the whole nacelle.

BRIEF SUMMARY OF THE INVENTION

The present invention has been made in view of the above situation and it is an object of the present invention to provide a wind turbine generator including a nacelle having reduced size and weight.

In order to solve the above problem, the present invention provides the following solutions.

A wind turbine generator according to the present invention includes a nacelle disposed on a tower. The nacelle includes a main shaft that is connected to a rotor head equipped with blades and that integrally rotates with the rotor head, a gearbox that increases the rotational speed of the main shaft and that outputs the resulting rotational speed, and a generator driven by the output from the gearbox. In the wind turbine generator, a drivetrain extending from the main shaft to the generator via the gearbox is disposed in the rotor head.

According to this wind turbine generator, the drivetrain extending from the main shaft to the generator via the gearbox is disposed in the rotor head, which is not hitherto used effectively. Consequently, the dimension of the nacelle in the shaft direction can be reduced, thereby reducing the size and the weight of the whole nacelle. This structure is particularly suitable for a high-output wind turbine generator in which an increase in the length of blades results in an increase in the size of rotor head, and thus a large installation space can be easily obtained in the rotor head.

In the above wind turbine generator, the generator is preferably a synchronous generator and the gearbox is preferably a single-stage speed-up gearbox including a plurality of planetary gears. According to this structure, since the synchronous generator capable of generating power at low rotational speed is used, the speed increasing ratio can be set to a small value. Furthermore, since the single-stage speed-up gearbox having a small speed increasing ratio can be used as the gearbox, the dimension of the drivetrain in the shaft direction can be reduced, and thus the drivetrain can be easily installed in the rotor head. In addition, since such a gear type gearbox has high reliability, the reliability of the drivetrain and the wind turbine generator can also be improved.

In this case, the planetary gears preferably form a multi-component structure in which five or more relatively small gears are used. Thereby, the gearbox can be further reduced in size.

In the above wind turbine generator, the generator is preferably a synchronous generator and the gearbox is preferably a traction drive. According to this structure, since the synchronous generator capable of generating power at low rotational speed is used, the speed increasing ratio can be set to a small value. Furthermore, use of the traction drive as the gearbox can reduce noise and can reduce the size in the radial direction. Consequently, the drivetrain can be easily installed in the rotor head.

According to the wind turbine generator of the present invention, the drivetrain extending from the main shaft to the generator via the gearbox can be installed using a space in the rotor head effectively. Therefore, the wind turbine generator of the present invention provides the following significant advantage: In particular, in a high-output wind turbine generator in which an increase in the length of the blades results in an increase in the size of rotor head and a large installation space that can be easily obtained in the rotor head, the dimension of the nacelle in the shaft direction can be easily reduced, thereby reducing the size and the weight of the whole nacelle.

DETAILED DESCRIPTION OF THE INVENTION

An embodiment of a wind turbine generator according to the present invention will now be described with reference to the drawings.

Figure 2:
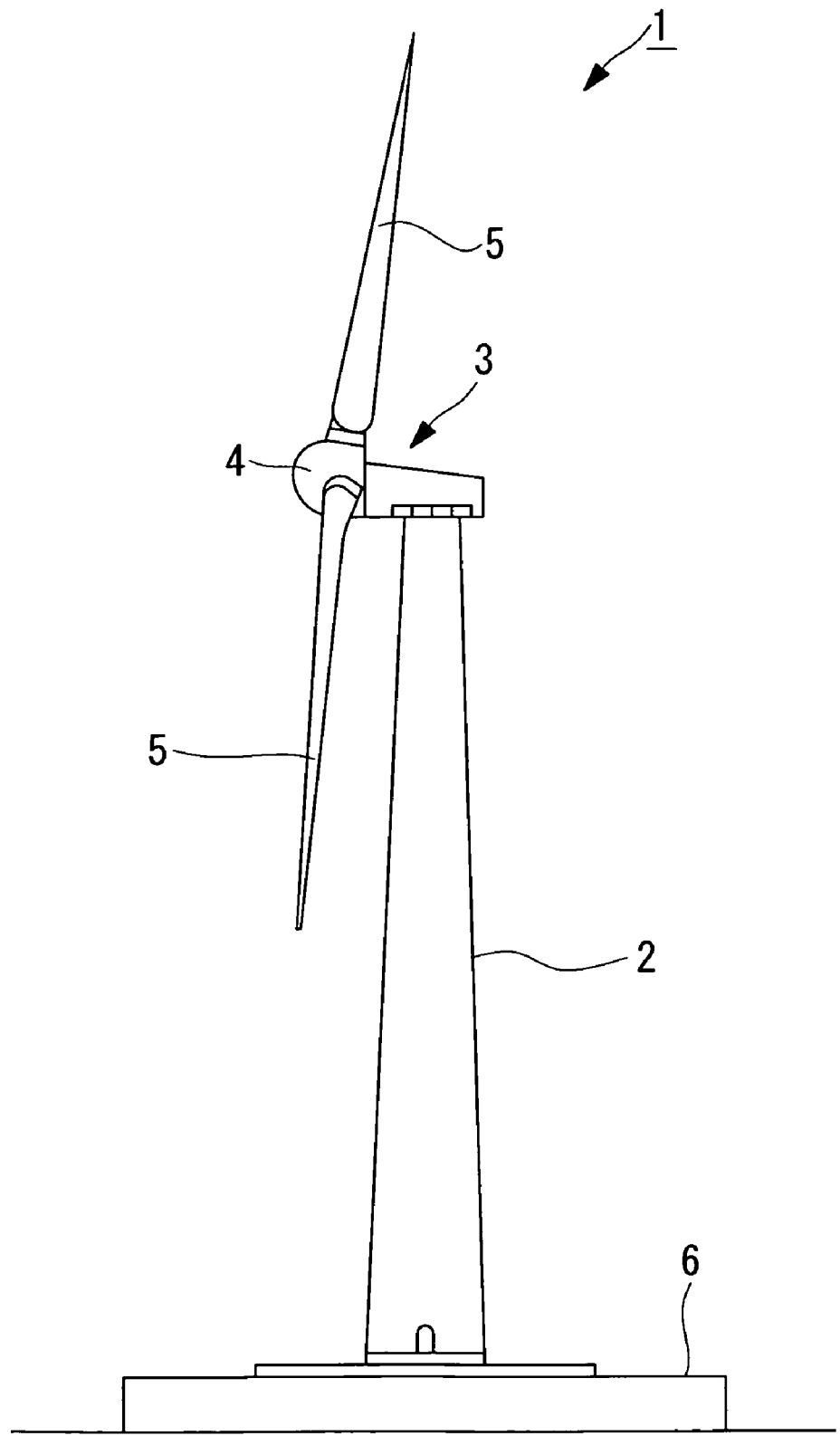
FIG. 2 is a view showing an example of the overall structure of the wind turbine generator.

A wind turbine generator 1 shown in FIG. 2 includes a tower 2 disposed on a foundation 6, a nacelle 3 provided on the upper end of the tower 2, and a rotor head 4 that is rotatable around a substantially horizontal axis and that is provided on the nacelle 3.

A plurality of blades 5 are provided on the rotor head 4 so as to be radially disposed around the rotation axis. Thereby, wind power supplied to the blades 5 from the direction of the rotation axis of the rotor head 4 is converted into motive power for rotating the rotor head 4 around the rotation axis.

Figure 1:
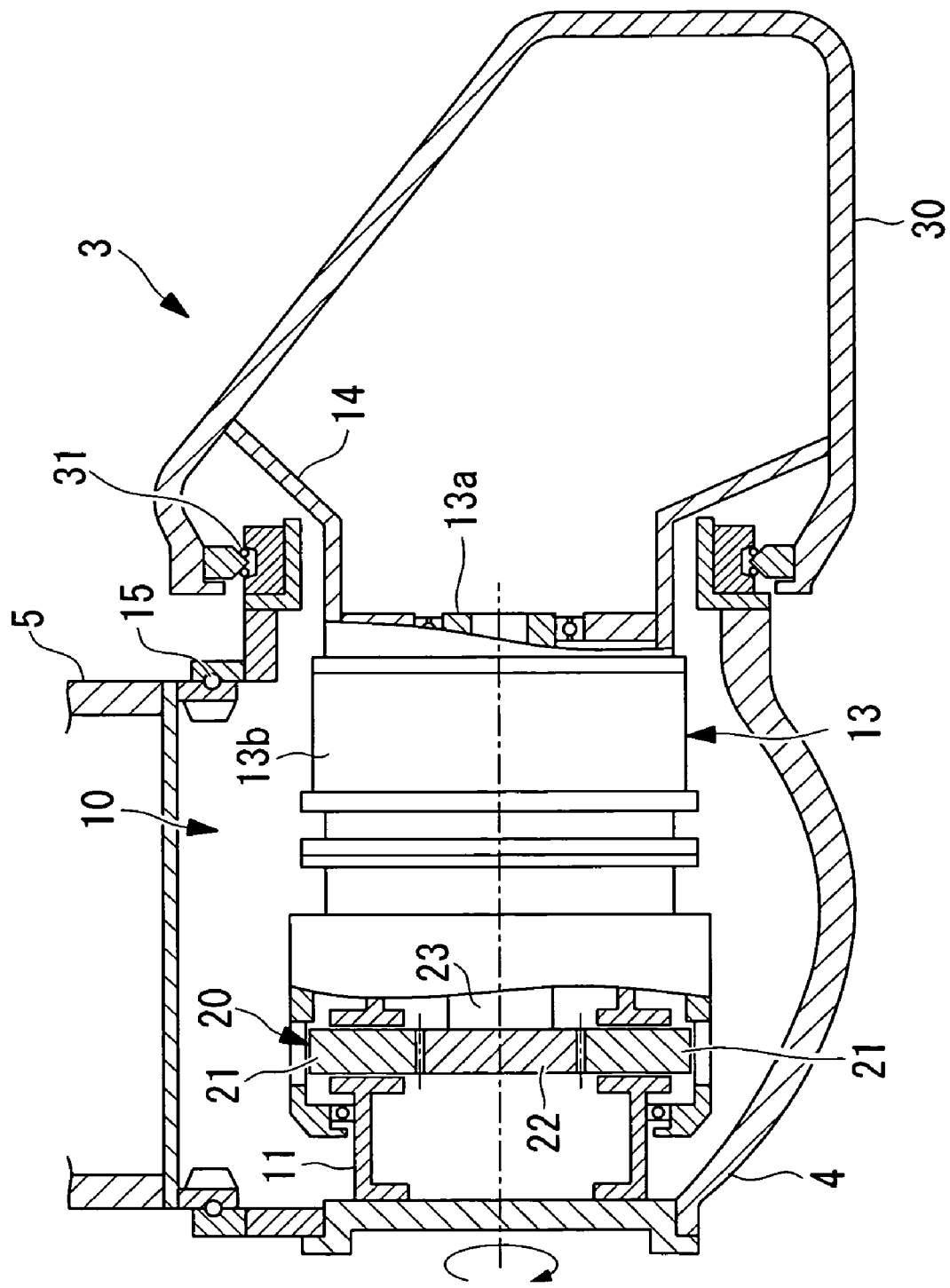
FIG. 1 is a view showing an embodiment of the wind turbine generator according to the present invention, namely, an enlarged cross-sectional view showing an example of the internal structure of the relevant part of a nacelle.

FIG. 1 is an enlarged cross-sectional view showing an example of the internal structure of the relevant part of the nacelle 3.

The nacelle 3 includes a nacelle bed 30 that is rotatable in the horizontal direction at the upper end of the tower 2 and the rotor head 4 that is disposed on the front end of the nacelle bed 30 and that integrally rotates with the blades 5.

The rotor head 4 is rotatably supported on the nacelle bed 30 with a main bearing 31 disposed therebetween. The inside of the rotor head 4 is hollow, and a drivetrain 10 for generating electric power from the wind power is placed in the hollow part.

The drivetrain 10 has a structure in which a main shaft 11 that is connected to and integrally rotates with the rotor head 4 having the blades 5, a gearbox 20 that increases the rotational speed of the main shaft 11 to output the resulting rotational speed, and a generator 13 that is driven by the output from the gearbox 20 are connected in series. In other words, the drivetrain 10 extending from the main shaft 11 to the generator 13 via the gearbox 20 is provided inside of the rotor head 4.

One end of the main shaft 11 is connected to the rotor head 4 and the other end thereof is connected to the gearbox 20. The main shaft 11 integrally rotates with the rotor head 4. The other end connected to the gearbox 20 forms an input shaft of the gearbox 20.

The gearbox 20 is a single-stage speed-up gearbox. Specifically, a plurality of planetary gears 21 is provided around the main shaft 11 serving as the input shaft, and the planetary gears 21 are disposed at the outer circumference of a sun gear 22 so as to be meshed with the sun gear 22. The gearbox 20 increases the rotational speed of the main shaft 11 and outputs the resulting rotational speed from an output shaft 23 that integrally rotates with the sun gear 22. In order to reduce the size of the gearbox 20, the planetary gears 21 used in this case preferably form a structure in which many small gears are used (i.e., a z-component structure). A multi-component structure in which about five to nine planetary gears 21 are used is preferred. The planetary gears 21 are rotatably supported around axes (not shown in the figure) that are disposed at regular pitches in the circumferential direction of the main shaft 11.

In the gearbox 20 having this structure, when the main shaft 11 serving as the input shaft rotates, the planetary gears 21 rotate around the sun gear 22 while rotating on their axes. Consequently, the output shaft 23 also integrally rotates with the sun gear 22, which meshes with the planetary gears 21. Thus, a rotational speed of the output shaft 23 obtained by increasing the rotational speed of the main shaft 11 according to the gear ratio between the planetary gears 21 and the sun gear 22 is output to the generator 13.

The generator 13 is a permanent magnet synchronous generator (PMSG) capable of generating power at low rotational speed. A diving shaft 13a of the generator 13 is directly connected to the output shaft 23 of the gearbox 20. A casing 13b of the generator 13 is supported by fixing it at an appropriate position of the nacelle bed 30 with an appropriate supporting member 14 therebetween.

In addition, a bearing 15 has a variable pitch mechanism which can adjust the pitch angles of the blades 5 relative to the rotor head 4.

In the structure of the above-described wind turbine generator 1, the drivetrain 10 extending from the main shaft 11 to the generator 13 via the gearbox 20 is provided in a space in the rotor head 4. Therefore, a space for installing the drivetrain 10 having a large dimension in the shaft direction need not be provided in the nacelle bed 30 of the nacelle 3. Consequently, the dimension of the nacelle bed 30 in the nacelle shaft direction can be reduced, thereby reducing the size and the weight of the whole nacelle 3. This structure is particularly suitable for a high-output wind turbine generator 1 in which an increase in the length of the blades 5 results in an increase in the size of the rotor head 4, and thus a large installation space can be easily obtained in the rotor head 4.

Additionally, various auxiliary mechanisms (not shown in the figure) can be disposed in the space formed inside of the nacelle bed 30.

In the wind turbine generator 1 of the above embodiment, the gearbox 20 is a single-stage speed-up gearbox. Alternatively, a traction drive may be used to reduce noise and to reduce the size in the radial direction. When a traction drive is used as the gearbox, preferably, the synchronous generator capable of generating power at low-speed rotation is also used as the generator 13.

Since this structure can also allow the speed increasing ratio to be set to a small value and can reduce the size in the radial direction, the drivetrain 10 can be easily installed in the rotor head 4.

As described above, the drivetrain 10 extending from the main shaft 11 to the generator 13 via the gearbox 20 is disposed to effectively use the space in the rotor head 4. Therefore, in a high-output wind turbine generator 1 in which a large installation space can be obtained because of the increase in the size of the rotor head 4, the dimension of the nacelle 3 in the shaft direction can be reduced, thereby reducing the size and the weight as a whole. Furthermore, since the drivetrain 10 having the above structure is completely installed inside the rotor head 4 that integrally rotates with the drivetrain 10, maintenance such as alignment adjustment can be easily performed.

The present invention is not limited to the above embodiment and may be appropriately modified without departing from the spirit and the scope thereof.

What is claimed is:

1. A wind turbine generator comprising a nacelle disposed on a tower, the nacelle comprising:
   a main shaft that is connected to a rotor head equipped with blades and that integrally rotates with the rotor head;
   a gearbox that increases the rotational speed of the main shaft and that outputs the resulting rotational speed; and
   a generator driven by the output from the gearbox, wherein a drivetrain extending from the main shaft to the generator via the gearbox is disposed in the rotor head.

2. The wind turbine generator according to claim 1, wherein the generator is a synchronous generator and the gearbox is a single-stage speed-up gearbox including a plurality of planetary gears.

3. The wind turbine generator according to claim 1, wherein the generator is a synchronous generator and the gearbox is a traction drive.

* * * * *